Aug. 24, 1965  C. C. PIERCE  3,202,459

WHEEL BALANCER

Filed Oct. 10, 1963

INVENTOR.
COMER C. PIERCE

BY Robert Irving Williams

ATTORNEY

United States Patent Office 3,202,459
Patented Aug. 24, 1965

3,202,459
WHEEL BALANCER
Comer C. Pierce, 1551 Alexandria Place,
Jacksonville, Fla.
Filed Oct. 10, 1963, Ser. No. 315,187
6 Claims. (Cl. 301—5)

This application is a continuation-in-part application of my co-pending application, Serial No. 232,442, filed Oct. 23, 1962, now abandoned.

This invention relates to a device for automatically compensating for imbalance present in a wheel or tire, such compensation being effectuated automatically during rotation of a wheel and tire in the course of travel of a vehicle on which the wheel and tire are mounted.

It is not economically possible to make tires and wheels with perfect weight distribution. As a result, new tires and wheels usually are out of balance. The tires in particular may be out of balance. Automobile tires may be out of balance up to 3.5 to 4.0 ounces and truck tires up to one-half pound or more. The wheels and tires may be balanced by installing weights on the wheel rims, but the weights gradually move, and the tires wear with use. As a result even with careful driving, the wheels and tires are often out of balance after a few thousand miles. In addition, if a puncture is repaired, the tire becomes damaged, or the wheel receives a vigorous bump during parking, or a foreign object is picked up by a tire, the balance of the wheel assembly i.e. the wheel and tire is affected.

The present invention comprises a hollow annulus containing movable weighted material which may be readily positioned on the tire rim of a vehicle wheel, and which will automatically compensate for any imbalance present in the wheel and tire up to the maximum for which the device is capable of compensating, such compensation being effectuated automatically above the critical speed of the wheel during rotation of the wheel and tire in the course of travel. Each wheel as installed on a vehicle has a critical speed. The critical speed might be thought of as that speed at which an imbalance begins to cause vibration. Fortunately it occurs at a relatively low speed, and also fortunately tire wear and wheel vibration are quite low or inconsequential below the critical speed. References herein to balancing or compensating should be understood as involving conditions above the critical speed. Additionally, at ordinarily-higher "barrier" speeds there is a vibration of the vehicle itself in overcoming which a properly balanced wheel assembly is a factor.

An object of the invention is to provide an improved device for balancing or compensating automatically above the critical speed for imbalance present in a wheel assembly.

Another object is to provide an imbalance compensating means adaptable to wheel rims of varying minor rim variations such as to wheels with variations in the size of rims nominally of the same diameter.

Another object is to provide a device with means whereby the device may be readily removed undamaged from a wheel rim and reused.

Another object of the invention is to provide a device containing discrete particles of a heavy material of a character and/or in an amount which will move freely enough to cause the wheel to be balanced quickly and continuously, and yet will not move so freely that slight accelerations and decelerations will destroy the balance.

Another object of the invention is to provide a device which, although it will accommodate minor variations in sizes or rims such as found, for example, in those nominally of the same diameter, it may be hermetically sealed so that it will have a long effective life in use as well as in storage.

A further object of the invention is to self-compensate automatically for increasing or decreasing imbalance occasioned by wear of the tires, and which completely eliminates the necessity of the hitherto known means of balancing a wheel assembly periodically by the external attachment of lead weights or the like.

A further object of the invention is to eliminate the need for costly equipment or technical skill necessary for the balancing of a wheel assembly by means of lead weights or the like.

Still further objects of the invention are to increase the life in service or mileage of vehicle tires, improving the riding comfort of motor vehicles, reduce wear and tear on the wheels and associated parts, and reduce the strain and fatigue of the driver.

It will be recognized from the foregoing objectives that the invention provides a device which balances automatically a wheel assembly. It may be installed simply and quickly by a layman with a screwdriver and pliers, and will last indefinitely without a decrease in its effectiveness unless physically damaged.

It is evident that my invention is an important advance in the art since prior to my invention such a device was not available, even though there had been a great need for it for many years, and large sums of money are spent by operators of vehicles to get temporary or partial relief from the bad effects of wheel assembly imbalance.

My invention comprises an annulus containing polyparticulate, granular, or other suitable type of material, for example, metal dust or metal shot, a flexible hermetically sealed expansion joint, and means for attaching the annulus to a wheel rim. The rotation of the wheel assembly above its critical speed moves the metal dust away from and opposite the imbalance or heavy area, thus permitting the wheel assembly to have perfect weight distribution around its circumference.

The annulus may be made of any suitable material, such as plastic or metal. When metal is used it may be coated or treated as by cadmium zinc dichromate, chrome, or blue zinc, or when plastic is used it may be made ornamental such as by using solid colors or stripes. Steel is preferred because of its ruggedness, ease of fabrication, and long life.

Lead shot or balls suitably lubricated, for example by graphite, are preferred as the weighted material. These materials move freely enough or have sufficient flowability to move and cause a wheel assembly to be balanced quickly and yet have sufficient drag or resistance to flow so that slight accelerations and decelerations do not destroy the balance. Lead dust, steel dust, shot or balls are also satisfactory.

The annulus may be made, for example, with an expansion joint as illustrated, or with the two ends of the annulus joined by a limited-action bushing that circumvents the ends — the ends being crimped longitudinally and the circumvented bushing dimpled into the longitudinal area to prevent disengagement of the ends. This allows one tube end to slide in or out of the other tube end into the expanded end in which it is inserted. The area where the ends meet is covered by an elastomeric material or tubing, such as neoprene rubber. The ends of the tube are "vulcanized" i.e. bonded to the tubing, giving a hermetic seal. This allows the joint to expand and seals the joint. The seal keeps moisture and air out of contact with the weighted material. This is important to insure long life of the device in service. The bushing causes a certain amount of drag on the weighted material which helps the balancing. In automobile wheels nominally of the same size the edge of the rim may vary as much as 0.25 to 0.4 inch in diameter. The design of this expansion joint allows an annulus of a given size to fit all wheels of the same nominal size. More than one expansion joint in an annulus may be used if desired.

The annulus is secured to and centered on the wheel rim by means by flexible spring clips, one form of which will be described in detail in connection with the drawing. Although any desired number of clips may be used, for automobile wheels four, as illustrated, work well; and five, with one each being placed close to and on each side of the seal, may be used. The clips are important for the ready attachment of the annulus to the wheel rim. They are made of such a design that they center the annulus in relation to the wheel, and so that they may be easily attached to or removed from a wheel rim. Thus, the device may be removed to avoid being damaged when the tire is removed or may be transferred from one wheel to another, or from one car to another, as long as the wheels have the same nominal diameter. The device may be attached either on the outside or inside of a wheel. Better results may be obtained in some cases if two are used on each wheel, one on the inside and one on the outside, although as a practical matter, this is usually not necessary.

Still other objects reside in the combinations of elements, arrangements of parts, and features of construction, as will be more fully pointed out hereinafter and disclosed in the accompanying drawing wherein there is shown a preferred embodiment of this inventive concept.

In the drawing.

Similar reference characters refer to similar parts throughout the several views of the drawing.

Figure 1:
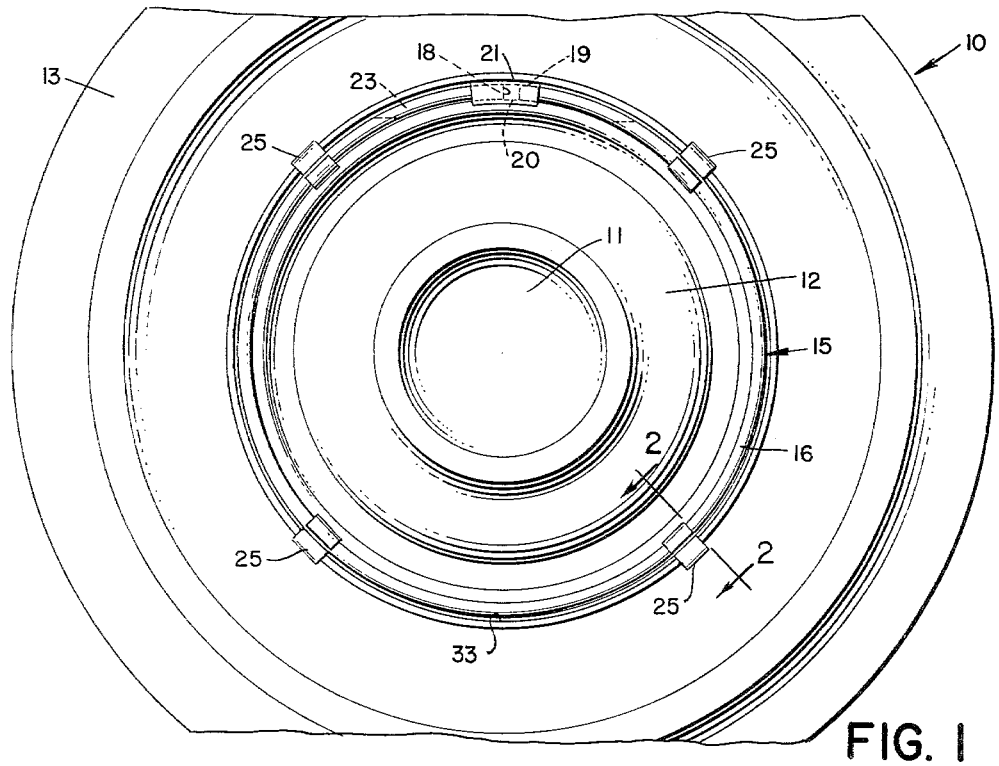
FIGURE 1 is a side elevational view of a wheel, rim, and tire, parts thereof being broken away, disclosing the balacing device of the instant invention affixed thereto, certain concealed parts being indicated in dotted lines.
Figure 2:
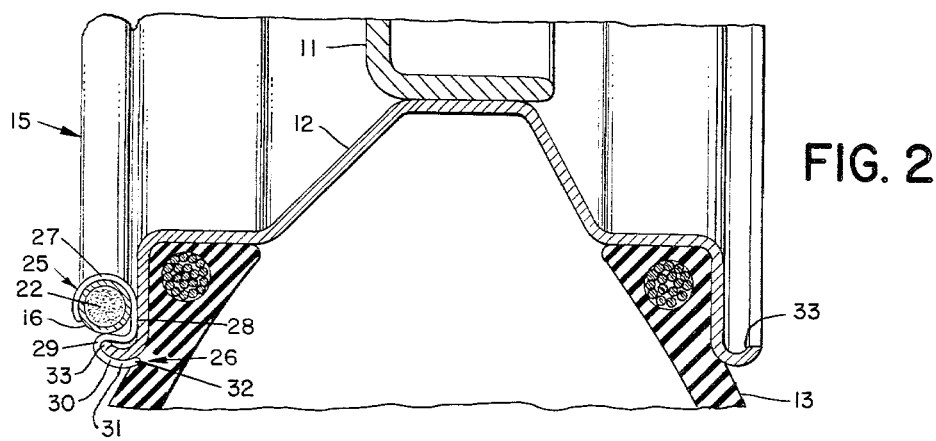
FIGURE 2 is an enlarged sectional view taken substantially along the line 2—2 of FIGURE 1 as viewed in the direction indicated by the arrows.
Figure 3:
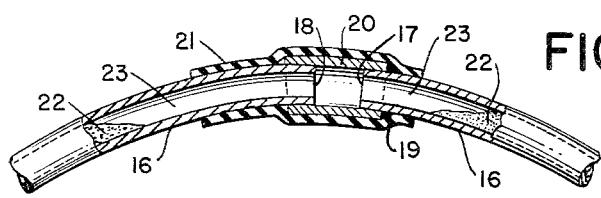
FIGURE 3 is a fragmentary view partially in elevation, and partially in section, disclosing a constructional detail.

Having reference now to the drawing in detail, there is generally indicated at 10 a vehicle wheel which includes a hub 11 and a rim 12 on which is mounted a tire 13. The balancing device of the instant invention is generally indicated at 15, and comprises an annulus 16 which extends entirely about the rim. While the annulus is herein shown as circular in cross-section, it will be understood that the same may be square, rectangular, polygonal, or of any other desired cross-sectional shape. As best shown in FIGURE 3, tube 16 is separated at a suitable circumferential point, and one end 17 thereof has welded or otherwise suitably affixed thereto as by welding 19 a collar or ferrule 20 which may also be integrally formed on the tube by expanding the end of the tube and which is of an arcuate configuration generally conforming to the radius of curvature of the tube, and of such a diameter that the one end 17 fits snugly therewithin. The other end 18 of separated annulus 16 telescopically engages within collar 20, and is normally movable therein to compensate for the various outside diameters of wheel rims which are normally of the same dimension, such dimensions varying, in vehicle wheels, throughout a limited range. A rubber flexible sleeve 21 formed from suitable material, preferably neoprene, is fitted over collar 20 and the adjacent ends 17 and 18 and "vulcanized" i.e. bonded in place to make a tight elastic seal and to permit adjustment of the tube. Various types of bonding, as by an adhesive, may be employed.

Tube 16 is filled preferably with a poly-particulate, granular or other suitable type of discrete-particle material 22, for example, lead or steel dust or shot, the filling being substantially complete except for a restricted or void space 23 which is of a size which would hold enough mass of the solid material to correct the imbalance. For maximum imbalance of automobile and like wheel assemblies the void space 23 would amount to less than thirty-five percent of the volume of the annulus. Lead dust is illustrated. Instead, lead shot 0.035 to 0.045 inch in diameter may be used in a tube having an inner diameter of five-sixteenths of an inch, for example.

Annulus 16 is secured to the rim 12 of a vehicle tire by means of spring clips, generally indicated at 25, such clips comprising an inwardly turned end portion 26 and a semi-circular portion 27 adapted to surround the tube or annulus, the portion 27 merging into a straight portion 28 which is outwardly bowed as at 29 and reverted as at 30 to include an inwardly extending portion 31 having an upturned extremity 32 adapted to clamp around the upturned end 33 of rim 12, and to be held in a fixed position by friction between the rim 12 and the tire 13 as by being wedged therebetween as shown or otherwise anchored to prevent rotative traveling of the clips. Adhesive may be applied to or serrations formed on this extremity portion 32 of the clip to increase the friction. Any desired number of clips 25 may be employed, although in the illustrative embodiment four are shown.

In the use and operation of the device, the clips are affixed to the annulus 16 at the factory before the ends are filled and sealed. The annulus is suitably adjusted to the desired size by telescopic movement of the end 18 within the collar 20. The desired overall diameter of the annulus is held fixed permanently by the clips only while it is attached to the wheel. The annulus may be removed and attached to another wheel or rim of either larger or smaller diameter up to the expansion limits. Sleeve 21 is vulcanizably sealed in place and the device is adapted for permanent use.

As hereinbefore stated, the lead dust or other discrete particle solid material or "aggregate" used will, upon rotation of the wheel above its critical speed automatically move away from the point or points of imbalance and adjust to a circumferential distribution with its center of gravity diametrically opposite the center of gravity of the tire-wheel assembly imbalance, whereby the wheel and balancer combinations will be balanced.

Contrary to the teaching in the art, the inner cross sectional diameter and the resultant volume of the annulus should be great enough so that it will hold several times as much as the maximum imbalance to be corrected. Again, contrary to the teaching in the art, a small amount of weighted material in the annulus just equal to or moderately greater than the imbalance will not do a good job of correcting the imbalance. Apparently the small amount of material tends to spread in the tube or a sufficient quantity of it does not concentrate opposite the point of imbalance. A great deal more of weighted material has been found to be advantageous, such that the tube is more than half filled. Assuming the aggregate is compacted in one continuous arc the maximum balancing effect is then contributed by the weight of the arcuate length of aggregate which is opposite the arcuate length of void. The remaining two arcuate lengths of aggregate, being equal and opposite to each other, do not contribute to the balancing effect. But the much greater amount of aggregate has the advantage of stabilizing itself more effectively in position and distribution under normal operations with the result that the wheel is maintained in better balance than with a less than or half filled balancer. Even beyond this consideration, the precise weight of aggregate opposite the void, as defined above, is important.

It has been found after extensive study and testing that excellent results may be obtained under the conditions shown below for 13, 14 and 15 inch automobile tires ising 0.35–0.50 inch lead shot lubricated with graphite. The centrifugal force of the weighted material in the tube apparently advantageously offsets the smaller amount of void space. The foregoing is brought out clearly in the following tabulation. Compensation for the imbalance may also be obtained with a void space equivalent in weight to the maximum imbalance.

| Diameter of wheel, in. | Circumference of annulus, in. | I.D. of annulus, in. | Lead in annulus, oz. | Void space in annulus in. | Void Space in equivalent ounces of lead |
|---|---|---|---|---|---|
| 13 | 42.8 | 0.32 | 11.25 | 6.5 | 2.5 |
| 14 | 46.3 | 0.32 | 12.50 | 7.0 | 2.7 |
| 15 | 49.5 | 0.32 | 14.25 | 9.0 | 3.5 |

Effective balancing results for a 4.5 ounce imbalance were obtained for the 0.32″ inner diameter annulus with the relation of weight to void space shown. The void space in the annulus represents about 15–20% of the total annulus space, and the lead in the annulus is about 80–85% of the total capacity when full. Good results were also obtained in a 13-inch diameter wheel when the void space was equivalent to five ounces of lead occupying 36% of the annulus. In general it may be said that the annulus should be 64% to 94% full.

Excellent balancing results were obtained on a 14 inch wheel with a 0.75 inch tube containing 52.5 ounces of lead dust and a void space equivalent to 5.0 ounces of lead. The tube was filled with lead dust and then 5.0 ounces of lead dust removed, leaving the tube 91.5% full. With a 3.0 ounce imbalance on one of the front wheels, by installing a lead weight to the balanced wheel, the Imperial car was driven at 30, 40, 50, 60, 70, 80, and 90 miles per hour. At all speeds there was a smooth feel on the steering wheel and on the seat, indicating a balanced condition. This was in contrast to the ride without the balancing device, in which there was much vibration through the steering wheel and noticeable bouncing of the seat due to the galloping of the unbalanced wheel.

The amount of weighted material and void space are determined by the maximum amount of imbalance it is desired to correct, as lesser amounts of imbalance will also be corrected.

While the device has been herein shown as particularly applicable to a vehicle wheel, such, for example, as an automobile, truck, or aircraft landing wheel, it is to be understood that the same principle may be equally advantageously applied to any other rotatable wheel or disc, such as a pulley, a flywheel, or any analogous device.

From the foregoing it will now be seen that there is herein provided an improved balancing device particularly adapted for vehicle wheels although equally applicable to other rotating circular devices which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

What is claimed is:

1. A device to compensate automatically for and correct imbalance in a rotatable wheel or the like above a critical speed, comprising a hollow tubular annulus, metallic aggregate partially filling said annulus and having a volume equal to at least 64% of the volume within said annulus and having a weight at least twice the maximum imbalance to be compensated, a flexible expansion joint in said annulus, and means for securing said annulus to a wheel rim.

2. A device as set forth in claim 1 wherein the securing means is in the form of spring clips having portions adapted to be anchored between the rim and the tire.

3. A device to compensate automatically for and correct imbalance in a rotatable wheel or the like above its critical speed, comprising a hollow metallic annulus, a quantity of metallic aggregate to partially fill the annulus to the extent of 64–94 percent, said annulus comprising an elastic expansion joint, and clips for securing and centering said annulus to a wheel rim.

4. A device to compensate automatically for and correct imbalance in a rotatable wheel or the like above a critical speed comprising a generally annular hollow tubular relatively unstretchable member transversely divided to provide at least two opposed ends separable from each other, balance-compensating material partially filling said hollow member and disposed therein for movement from one position to another therein thruout its length, a relatively stretchable sleeve adherently sealed over said opposed ends and providing a closure for said hollow member to provide a generally annular closed path for the movement of said material from one position to another regardless of which of several distances said opposed ends are separated, and clips having portions for engaging said tubular member and portions for securing said tubular member to a wheel rim.

5. A device as in claim 4 wherein said material is metallic aggregate, and said sleeve is formed of elastic material.

6. A device as in claim 4 wherein said clips comprise portions adapted to be anchored between a rim and a tire.

References Cited by the Examiner

UNITED STATES PATENTS

| | | | |
|---|---|---|---|
| 1,209,730 | 12/16 | Leblanc | 301—5 |
| 1,314,005 | 8/19 | Louden | 301—5 |
| 1,829,236 | 10/31 | Perkins | 285—236 X |
| 2,801,883 | 8/57 | Householder | 301—5 |
| 2,909,389 | 10/59 | Wilborn | 301—5 |
| 3,006,690 | 10/61 | Pierce | 301—5 |
| 3,077,914 | 2/63 | Fritts | 301—5 |

FOREIGN PATENTS 252,516  6/26  Great Britain.

ARTHUR L. LA POINT, *Primary Examiner.*